(12) United States Patent
Lee et al.

(10) Patent No.: US 9,490,889 B2
(45) Date of Patent: Nov. 8, 2016

(54) ANTENNA DIVERSITY AND BEAMFORMING COEXISTENCE METHOD AND MACHINE READABLE MEDIA

(71) Applicant: Realtek Semiconductor Corp., HsinChu (TW)

(72) Inventors: Shen-Chung Lee, Taoyuan County (TW); Chien-Wei Hsin, Kaohsiung (TW); Tsung-Hsuan Lee, Taipei (TW); Chung-Yao Chang, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 68 days.

(21) Appl. No.: 14/516,569

(22) Filed: Oct. 16, 2014

(65) Prior Publication Data

US 2015/0189520 A1    Jul. 2, 2015

(30) Foreign Application Priority Data

Dec. 31, 2013   (TW) .............. 102149390 A

(51) Int. Cl.
| | | |
|---|---|---|
| *H04W 24/00* | (2009.01) | |
| *H04W 80/04* | (2009.01) | |
| *H04W 52/24* | (2009.01) | |
| *H04B 7/08* | (2006.01) | |
| *H04B 7/06* | (2006.01) | |

(52) U.S. Cl.
CPC .......... *H04B 7/0871* (2013.01); *H04B 7/0689* (2013.01); *H04B 7/0608* (2013.01); *H04B 7/0617* (2013.01); *H04B 7/0802* (2013.01); *H04B 7/086* (2013.01)

(58) Field of Classification Search
CPC ... H04W 52/40; H04W 84/12; H04W 88/06; H04W 80/04; H04W 88/08; H04W 36/30
See application file for complete search history.

(56) References Cited

U.S. PATENT DOCUMENTS

| | | | | |
|---|---|---|---|---|
| 8,351,855 | B2 * | 1/2013 | Castaneda ................ | H04B 7/10 235/492 |
| 2012/0008510 | A1 * | 1/2012 | Cai ....................... | H04B 7/0404 370/252 |
| 2012/0314664 | A1 * | 12/2012 | Johansson ......... | H04W 74/0833 370/329 |
| 2013/0051261 | A1 * | 2/2013 | Kazmi ................. | H04B 7/0693 370/252 |
| 2013/0258873 | A1 * | 10/2013 | Stauffer ............ | H04L 25/03343 370/252 |
| 2014/0031046 | A1 * | 1/2014 | Wong ................... | H04W 36/18 455/442 |
| 2014/0056376 | A1 * | 2/2014 | Guo ........................ | H04B 7/06 375/267 |
| 2014/0080422 | A1 * | 3/2014 | Guo ........................ | H04B 7/06 455/67.11 |
| 2014/0092877 | A1 * | 4/2014 | Kazmi ................. | H04W 88/06 370/336 |

(Continued)

*Primary Examiner* — Andrew Lee
(74) *Attorney, Agent, or Firm* — Winston Hsu; Scott Margo

(57) ABSTRACT

An antenna diversity and beamforming coexistence method applied to a wireless communication device which supports both a transmitter/receiver (TX/RX) antenna diversity mechanism and a beamformer/beamformee mechanism includes the following steps: determining whether a plurality of wireless link partners linked to the wireless communication device respectively support the beamformer/beamformee mechanism and generating a determination result accordingly; and determining whether to enable/disable the TX/RX antenna diversity mechanism of the wireless communication device and to enable/disable the beamformer/beamformee mechanism of the wireless communication device according to the determination result; wherein when the beamformee mechanism is determined to be disabled, controlling the wireless communication device to transmit a default value in response to a received beamforming protocol packet.

18 Claims, 5 Drawing Sheets

(56) References Cited

U.S. PATENT DOCUMENTS

| | | | |
|---|---|---|---|
| 2014/0128032 A1* | 5/2014 | Muthukumar | H04M 1/72569 455/411 |
| 2014/0235287 A1* | 8/2014 | Maltsev | H04W 52/267 455/522 |
| 2015/0257121 A1* | 9/2015 | Siomina | H04W 64/003 455/456.6 |

* cited by examiner

ANTENNA DIVERSITY AND BEAMFORMING COEXISTENCE METHOD AND MACHINE READABLE MEDIA

BACKGROUND OF THE INVENTION

1. Field of the Invention

The disclosed embodiments of the present invention relate to a calibration method for a communication system and associated non-transitory machine readable medium, and more particularly, to an antenna diversity and beamforming coexistence method, wherein the method is applicable for a wireless communication device which supports both a transmitter/receiver (TX/RX) antenna diversity mechanism and a beamformer/beamformee mechanism, and an associated non-transitory machine readable medium.

2. Description of the Prior Art

In the field of wireless communication, antenna diversity effectively resists multi-path fading. The concept of antenna diversity is to select antenna(s) with stronger signal intensity or better signal quality from a plurality of antennas for data transmission and reception, to improve poor reception of a single antenna due to channel environment. Antenna diversity can be applied to a wireless local area network (WLAN). Beamforming is also adopted by some wireless communication systems, such as the IEEE 802.11n standard. Beamforming is a signal processing mechanism performed by a sensor array which directionally transmits/receives signals. Through adjusting parameters of basic elements of a phase array (PA), constructive interference is imposed on a signal coming from a certain angle while destructive interference is imposed on a signal coming from another angle. A beamforming mechanism is not generally supported by all of the IEEE 802.11n compatible products, however, as a result of its complexity and the lack of a uniform version. Further, a product with a beamforming mechanism may fail to comply with another when the two products are manufactured by different vendors which follow different versions of the beamforming standard. Subsequent IEEE 802.11ac standards therefore simplify and unify the beamforming mechanism in order to guarantee the compatibility.

Additionally, in conventional wireless communication systems, designers deal with the two mechanisms separately without an integrated solution. Coexistence of the two mechanisms will encounter mutual interference. For instance, if the antennal setting is switched (from one antenna to another) in response to antenna diversity mechanism during a beaforming process, the channel estimation previously made by the beamforming mechanism may be inappropriate for the new channel in response to the antenna switching. The reception of the link partner will become worse as a result of this mismatch. Therefore, there is an urgent need in this field for an antenna diversity and beamforming coexistence method which can dynamically decide an optimized configuration and thereby enable the two mechanisms to complement each other.

SUMMARY OF THE INVENTION

An antenna diversity and beamforming coexistence method applicable for a wireless communication device which supports both a transmitter/receiver (TX/RX) antenna diversity mechanism and a beamformer/beamformee mechanism, and an associated non-transitory machine readable medium, are disclosed to improve the aforementioned issues.

According to an exemplary embodiment of the present invention, an antenna diversity and beamforming coexistence method applicable for a wireless communication device which supports both a transmitter/receiver (TX/RX) antenna diversity mechanism and a beamformer/beamformee mechanism is disclosed. The method comprises: determining whether a plurality of wireless link partners linked to the wireless communication device support the beamformer/beamformee mechanism and generating a determination result accordingly; and determining whether to enable/disable the TX/RX antenna diversity mechanism of the wireless communication device and to enable/disable the beamformer/beamformee mechanism of the wireless communication device according to the determination result; wherein when the beamformee mechanism is determined to be disabled, controlling the wireless communication device to transmit a default value in response to a received beamforming protocol packet.

According to another exemplary embodiment of the present invention, a non-transitory machine readable medium is disclosed. The non-transitory machine readable medium stores a program code, wherein when executed by a processor, the program code enables the processor to perform an antenna diversity and beamforming coexistence method, wherein the method is applicable for a wireless communication device which supports both a transmitter/receiver (TX/RX) antenna diversity mechanism and a beamformer/beamformee mechanism, and comprises: determining whether a plurality of wireless link partners linked to the wireless communication device support the beamformer/beamformee mechanism and generating a determination result accordingly; and determining whether to enable/disable the TX/RX antenna diversity mechanism of the wireless communication device and to enable/disable the beamformer/beamformee mechanism of the wireless communication device according to the determination result; wherein when the beamformee mechanism is determined to be disabled, controlling the wireless communication device to transmit a default value in response to a received beamforming protocol packet.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is coupled to another device, that connection may be through a direct electrical connection, or through an indirect electrical connection via other devices and connections.

Figure 1:
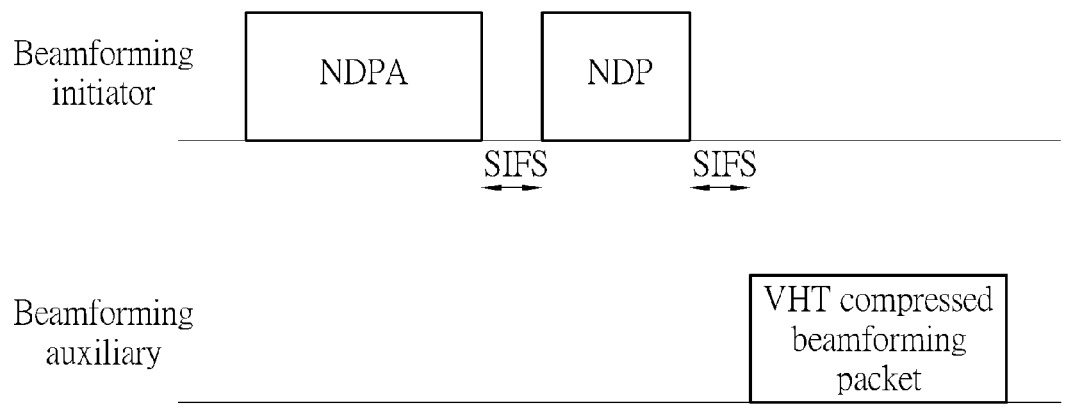
FIG. 1 is a diagram illustrating a VHT SU beamforming sounding protocol specified in the IEEE 802.11ac standard.

The disclosed embodiments of the present invention relate to an antenna diversity and beamforming coexistence method applicable to a wireless communication device which supports both a TX/RX antenna diversity mechanism and a beamformer/beamformee mechanism. Please refer to FIG. 1 for an illustration of the approximate processes of a conventional beamforming mechanism. FIG. 1 illustrates a Very High Throughput (VHT) Single User (SU) beamforming sounding protocol specified in the IEEE 802.11ac standard. As depicted in FIG. 1, a beamforming initiator (i.e. a beamformer) transmits a Null Data Packet Announcement (NDPA) at the beginning of the beamforming mechanism, so as to notify a beamforming auxiliary (i.e. a beamformee) to be ready for receiving a Null Data Packet (NDP). The beamformer subsequently sends the NDP after the NDPA followed by a Short Inter-Frame Space (SIFS). Once the beamformee receives the NDP, the beamformee responds with a VHT compressed beamforming packet, wherein the content of the VHT compressed beamforming packet may include Channel State Information (CSI) for the beamformer's reference. Hence, the beamformer can utilize the information in the VHT compressed beamforming packet as a guide to perform corresponding adjustment when transmitting data to the beamformee. This allows reception ability of the beamformee with respect to the data transmitted from the beamformer to be improved. By using the beamforming mechanism, the transmission distance and overall throughput between wireless devices can be upgraded. This is for illustrative purposes only, and not a limitation of the present disclosures. In fact, any other protocols or standards which achieve the same or similar functions and comply with the concept of the present invention all fall within the scope of the present invention.

The principle of the antenna diversity mechanism is described as follows. A wireless communication device which utilizes the antenna diversity mechanism has at least one extra transmitting and receiving antenna. For instance, a wireless communication device has a basic set of transmitting/receiving antenna (1T1R) which supports 1 spatial stream and two additional sets of transmitting/receiving antenna (3T3R) for mitigating multi-path fading during data transmission. Please note that this is not a limitation of the present invention. When the wireless access point (AP) with multiple transmitting and receiving antennas remains connected with a wireless link partner, the wireless AP with multiple transmitting and receiving antennas will dynamically switch the receiving antennas according to the information received from the link partner. For example, the wireless AP with multiple transmitting and receiving antennas selects a receiving antenna with highest signal strength with respect to the wireless link partner from the 3 receiving antennas. Moreover, the wireless AP always updates the selection of the receiving antenna according to the channel variation. In contrast, when the wireless AP needs to transmit data to the wireless link partner, a transmitting antenna can be selected according to the selection result of the receiving antenna in light of the reciprocal characteristic of a channel. This involves selecting the transmitting antenna corresponding to the receiving antenna to transmit data to the wireless link partner. The above descriptions are basic principles of the receiving/transmitting antenna diversity mechanism.

It should be noted that, when performing the beamforming mechanism, dynamic switching of the transmitting/receiving antennas is not allowed in general cases; otherwise performance of the beamforming mechanism may degrade. The spirit of the present invention is to disclose an effective antenna diversity and beamforming coexistence method applicable for a wireless communication device which supports both the transmitter/receiver (TX/RX) antenna diversity mechanism and the beamformer/beamformee mechanism. In the following paragraphs, the link is divided into several situations for illustrative purpose, and details of the coexistence method with respect to each situation will be described.

Figure 2:
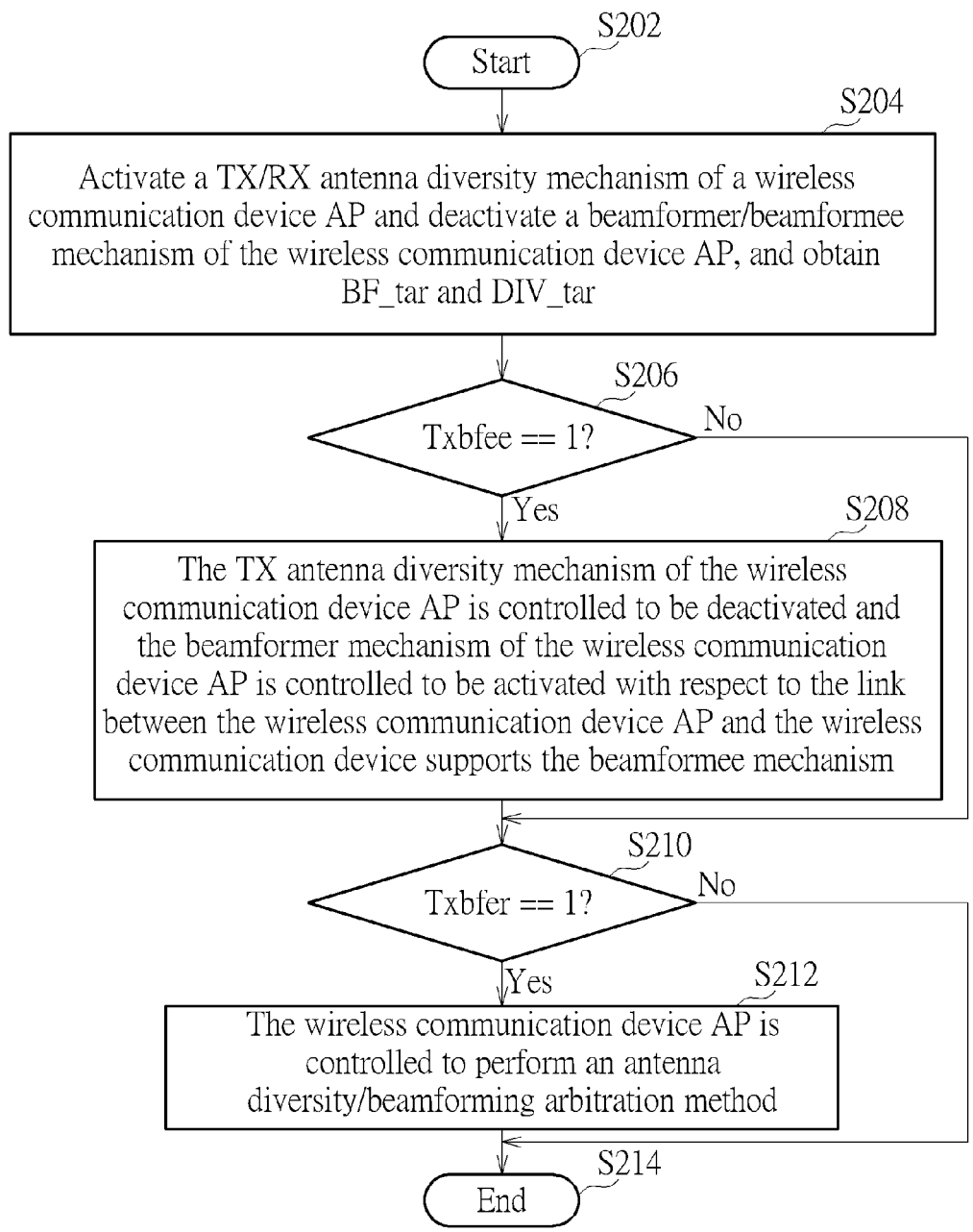
FIG. 2 is a flowchart illustrating an antenna diversity and beamforming coexistence method according to an embodiment of the present invention

FIG. 2 is a flowchart illustrating an antenna diversity and beamforming coexistence method according to an embodiment of the present invention, wherein the antenna diversity and beamforming coexistence method is applicable for a wireless communication device AP which supports both the TX/RX antenna diversity mechanism and the beamformer/beamformee mechanism, for instance, a wireless router or a wireless base station. Provided that substantially the same result is achieved, the steps in FIG. 2 need not be in the exact order shown and need not be contiguous; that is, other steps can be intermediate. Some steps in FIG. 2 may be omitted according to various embodiments or requirements. Details of the antenna diversity and beamforming coexistence method are described as follows.

After the wireless communication device AP is activated (step S202), the wireless communication device AP is controlled to enter an initial state. Subsequently, a plurality of wireless communication devices STA link up with the wireless communication device AP, wherein a portion of the linked wireless communication devices STA may support the beamformer/beamformee mechanism. A device which supports the beamformer mechanism does not necessarily initiate beamforming process. An economical way is to initiate beamforming process only when the channel is poor (or extremely poor), so as to save power and reduce complexity. The beamformer/beamformee mechanism may be deactivated and the link can still remain stable in situations where channel quality is beyond normal. Please note that the roles of beamformer and beamformee have been respectively determined in the course of the link-up process between the wireless communication device AP and each of the linked wireless communication devices STA. Unless the wireless communication device AP and the linked wireless communication devices STA rebuild a link between the two, the roles of beamformer/beamformee of each side of the link will remain intact. When it is determined to suspend the beamformer mechanism of the wireless communication device AP, the wireless communication device AP will not initiate the beamforming process anymore; however, when it is determined to suspend the beamformee mechanism of the wireless communication device AP, the wireless communication device AP may still receive the beamforming protocol packet. In this case, the wireless communication device AP may send a default (e.g. a default matrix or a unit matrix) in response to the received beamforming protocol packet, rather than sending a channel status information matrix calculated in accordance with the measured channel status. In the initial state, the wireless communication device AP may be controlled to merely activate the antenna diversity mechanism and deactivate the beamforming mechanism; i.e. to activate the TX/RX antenna diversity mechanism of the wireless communication device AP and deactivate the beamformer/beamformee mechanism of the wireless communication device AP (step S204). In this case, the wireless communication device AP respectively selects a RX antenna having the highest signal strength with respect to each of the linked wireless communication devices STA, and updates the TX antenna according to the selected RX antenna. Please note this is only for illustrative purposes, and is not intended to be a limitation of the present invention. In fact, any other protocols or standards which achieve the same or similar functions and comply with the concept of the present invention fall within the scope of the present invention. For example, the antenna diversity mechanism and the beamforming mechanism of the wireless communication device AP may both be deactivated in the initial state.

Figure 3:
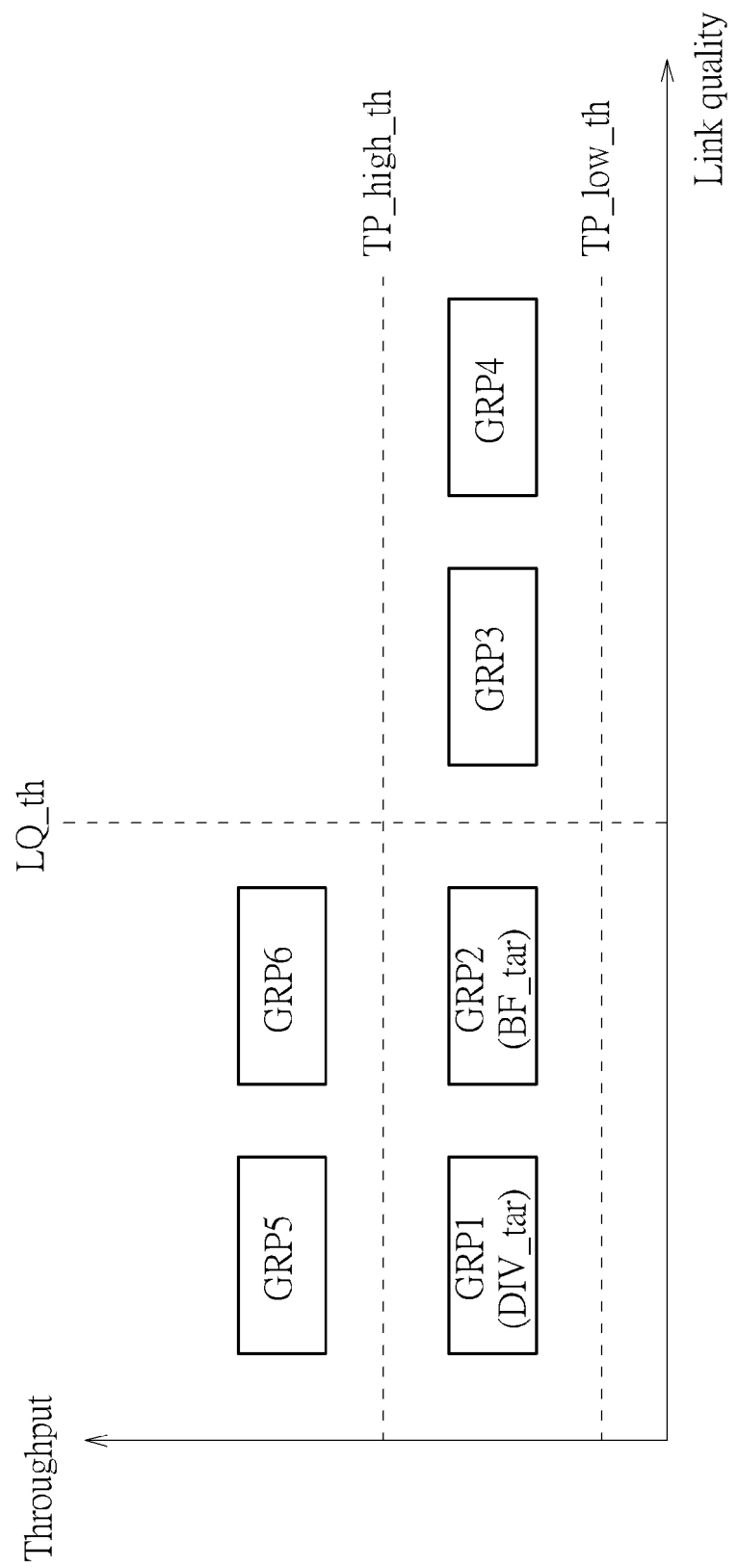
FIG. 3 is a diagram illustrating grouped wireless communication devices STA.

Please refer to FIG. 3, which is a diagram illustrating the grouped wireless communication devices STA. In FIG. 3, the linked wireless communication devices STA are divided into a first linked wireless communication devices GRP1, a second linked wireless communication devices GRP2, a third linked wireless communication devices GRP3, a fourth linked wireless communication devices GRP4, a fifth linked wireless communication devices GRP5, and a sixth linked wireless communication devices GRP6, wherein the first linked wireless communication devices GRP1, the third linked wireless communication devices GRP3, and the fifth linked wireless communication devices GRP5 as illustrated by solid lines belong to the linked wireless communication devices group of the linked wireless communication devices STA which do not support the beamformer mechanism; and the second linked wireless communication devices GRP2, the fourth linked wireless communication devices GRP4, and the sixth linked wireless communication devices GRP6 as illustrated by dotted lines belong to the linked wireless communication devices group of the linked wireless communication devices STA which support the beamformer mechanism.

Specifically, the horizontal axis is used to indicate the link quality between the wireless communication device AP and the linked wireless communication devices STA, wherein the link quality may be one of or the combination of a portion or all of the Received Signal Strength Indicator (RSSI), the Modulation and Coding Scheme (MCS), the Signal-to-Noise Ratio (SNR), the Error Vector Magnitude (EVM), the Channel State Information (CSI), the Bit Error Rate (BER), and the Packet Error Rate (PER). The vertical axis is used to indicate the throughput between the wireless communication device AP and the linked wireless communication devices STA. This is for illustrative purposes only, and is not intended to be a limitation of the present invention. Other protocols or standards which achieve the same or similar functions and comply with the concept of the present invention all fall within the scope of the present invention. The objective of depicting the linked wireless communication devices STA in corresponding locations in FIG. 3 according to the link quality and the throughput is to determine which wireless communication device(s) need to be improved for link quality. In addition, the antenna diversity/beamforming arbitration which is then performed upon the wireless communication device(s) needs to be improved.

According to the disclosed embodiments, the wireless communication device(s) with a throughput below a lower bound of a throughput threshold TP_low_th can be regarded as an inactive device and excluded from the target devices. The wireless communication device(s) with a throughput above an upper bound of a throughput threshold TP_high_th can be regarded as having good link quality with the wireless communication device AP. In addition, the wireless communication device(s) with a link quality above a link quality threshold LQ_th can be regarded as having good link quality with the wireless communication device AP. For the wireless communication device(s) having a throughput below the upper bound of the throughput threshold TP_high_th and above the lower bound of the throughput threshold TP_low_th, and a link quality below the link quality threshold LQ_th, i.e. the first linked wireless communication devices GRP1 and the second linked wireless communication devices GRP2, the link quality of these devices needs to be improved. The first linked wireless communication devices GRP1 is an antenna diversity target device group DIV_tar which does not support the beamforming mechanism, and the second linked wireless communication devices GRP2 is a beamforming target device group BF_tar which does not support the antenna diversity mechanism.

In step S204, the antenna diversity target device group DIV_tar and the beamforming target device group BF_tar are determined from the linked wireless communication devices STA for the subsequent steps. In step S206, TXbfee==1 indicates that at least one of the wireless communication devices STA linked with the wireless communication device AP can play the role of the beamforming auxiliary. In other words, at least one of the wireless communication devices STA linked with the wireless communication device AP supports the beamformee mechanism. If the condition TXbfee==1 is true, the flow will move to step S208; else the flow will move to step S210. In step S208, the TX antenna diversity mechanism of the wireless communication device AP is controlled to be deactivated and the beamformer mechanism of the wireless communication device AP is controlled to be activated with respect to the link between the wireless communication device AP and the wireless communication device supports the beamformee mechanism. The reason for the above configurations is to prevent the antenna diversity mechanism from switching the current RX antenna to another RX antenna and to force the current TX antenna to be updated to another TX antenna synchronously, wherein the channel corresponding to the current RX antenna has been estimated by a channel sounding process, and the calibration matrix is dedicated for the channel corresponding to the current RX antenna but not for the other RX antennas. The above configurations can therefore guarantee that the wireless communication device AP uses the same TX antenna in both the channel sounding process and the data transmission process (to prevent mutual interference between the beamforming mechanism and the antenna diversity mechanism in conventional designs).

It should be noted that the RX antenna diversity mechanism of the wireless communication device AP can operate independently without being affected by deactivation of the TX antenna diversity. This is because the contents of the VHT compressed beamforming packet sent by a wireless communication device supporting the beamformee mechanism will not alter even if the RX antenna changes. Therefore, the contents of the channel estimation will not be affected if the wireless communication device AP activates the RX antenna diversity mechanism while receiving packets, and in fact, this only improves the receiving ability of the wireless communication device AP. In addition, under the condition of TXbfee==1, for the wireless communication devices other than those which support the beamformee mechanism, it is unnecessary to deactivate the TX antenna diversity mechanism of the wireless communication device AP and activate the beamformer mechanism of the wireless communication device AP. Further, in case significant changes occur to the channel since the TX antenna may be kept unchanged for a long period, a compromised approach can be adopted in this embodiment. For every first specific time interval T1, the TX antenna diversity mechanism of the wireless communication device AP is temporarily activated in respect of the link with the wireless link partner which supports the beamformee mechanism, and the antenna diversity mechanism is maintained for a second specific time T2 to force the wireless communication device AP to update its TX antenna (under the condition that the RX antenna changes). This is only for illustrative purposes, and is not intended to be a limitation of the present invention.

Figure 4:
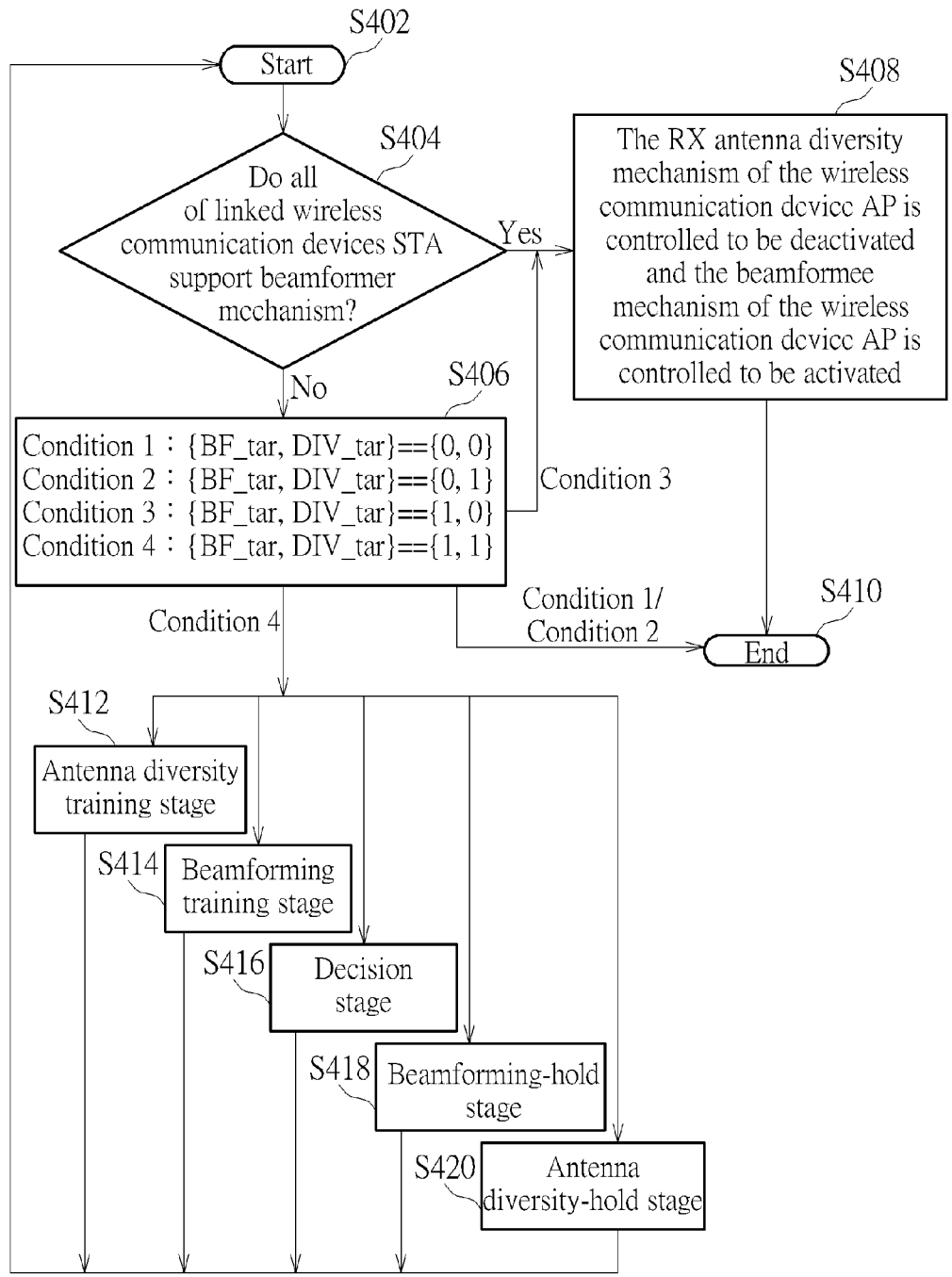
FIG. 4 is a flowchart illustrating the antenna diversity/beamforming arbitration method.

In step S210, TXbfer=1 indicates that at least one of the wireless communication devices STA linked with the wireless communication device AP can play the role of the beamforming initiator. In other words, at least one of the wireless communication devices STA linked with the wireless communication device AP supports the beamformer mechanism. If the condition TXbfer=1 is true, the flow will move to step S212; else the flow will move to step S214. In step S212, the wireless communication device AP is controlled to perform an antenna diversity/beamforming arbitration method. Details of the antenna diversity/beamforming arbitration method are shown in FIG. 4, which is a flowchart illustrating the antenna diversity/beamforming arbitration method. Provided that substantially the same result is achieved, the steps in FIG. 4 need not be in the exact order shown and need not be contiguous; that is, other steps can be intermediate. Some steps in FIG. 4 may be omitted according to various embodiments or requirements. Details of the antenna diversity/beamforming arbitration method are described as follows.

When the wireless communication device AP enters the antenna diversity/beamforming arbitration flow (step S402), it will be checked whether all the wireless communication devices STA linked with the wireless communication device AP support the beamformer mechanism. If yes, step S408 will be entered without the antenna diversity/beamforming arbitration. The RX antenna diversity mechanism of the wireless communication device AP is controlled to be deactivated and the beamformee mechanism of the wireless communication device AP is controlled to be activated, so that the wireless communication device AP can be ready for the beamforming process initiated by any one of the linked wireless communication devices STA at any time. Then, step S410 will be entered to end the flow. If not all of the wireless communication devices STA linked with the wireless communication device AP support the beamformer mechanism, step S406 will be entered, where 4 different conditions are included. Under condition 1, {BF_tar, DIV_tar}={0, 0}, which indicates that no linked wireless communication device STA stays in a target area with the throughput below the upper bound of the throughput threshold TP_high_th and above the lower bound of the throughput threshold TP_low_th, and with the link quality below the link quality threshold LQ_th. In other words, among the linked wireless communication devices STA, each device has a good link quality with the wireless communication device AP or remains in the inactive state with little amount of data transfer. All in all, when {BF_tar, DIV_tar}={0, 0}, there is no object need for arbitration, hence the flow will end at step S410.

Under condition 2, {BF_tar, DIV_tar}={0, 1}, which indicates that only the antenna diversity target device group DIV_tar stays in the target area. In this case, there is also no need for further antenna diversity/beamforming arbitration, and the wireless communication device AP can remain in its initial state. The flow will then end at step S410. Under condition 3, {BF_tar, DIV_tar}={1, 0}, which indicates that only the beamforming target device group BF_tar stays in the target area. In this case, there is also no need for further antenna diversity/beamforming arbitration, and step S408 will be entered directly, where the RX antenna diversity mechanism of the wireless communication device AP will be deactivated and the beamformee mechanism of the wireless communication device AP will be activated, so that the wireless communication device AP can be ready for the beamforming process initiated by any one of the linked wireless communication devices STA at any time. The flow will then end at step S410. It should be noted that the TX antenna cannot be updated normally due to the RX antenna diversity mechanism of the wireless communication device AP being deactivated. This means that the transmission quality of the transmission end of the wireless communication device AP may be poor. Therefore, for every a first specific time interval T1, the TX antenna diversity mechanism of the wireless communication device AP may be temporarily activated for a second specific time interval T2. This is only for illustrative purpose only, and is not intended to be a limitation of the present invention.

Under condition 4, {BF_tar, DIV_tar}={1, 1}, which indicates that the antenna diversity target device group DIV_tar and the beamforming target device group BF_tar both stays in the target area. It is slightly complicated for this case; therefore the antenna diversity/beamforming arbitration is required here for further determination. Please note that a complete arbitration mechanism includes 5 stages, i.e. steps S412-S420. First of all, when a new stage begins, an antenna diversity training stage of step S412 will be entered from step S406. At the antenna diversity training stage, the RX antenna diversity mechanism of the wireless communication device AP is activated and the beamformee mechanism of the wireless communication device AP is deactivated. Also, related information of the link quality is recorded instantly. In this embodiment, an antenna diversity information DIV_info can be derived from the related information of the link quality, which may be at least one of the Modulation and Coding Scheme (MCS) index and the throughput. For example, for a modulation and coding scheme based link quality evaluation criteria, the maximum and the minimum of the MCS index of both of the antenna diversity target device group DIV_tar and the beamforming target device group BF_tar during step S412 may be recorded respectively; or to calculate a weighted value according to the MCS indexs of all packets. For another example, for a throughput based link quality evaluation criteria, an average throughput of the antenna diversity target device group DIV_tar and an average throughput of the beamforming target device group BF_tar during step S412 may be recorded respectively. However, this is for illustrative purpose only, and not a limitation of the present disclosures. In fact, any other alternative designs which achieve the same or similar functions and comply with the concept of the present invention are all fall into the scope of the present invention.

Subsequently, the flow goes back to step S402, and then enters step S404 once more. If the condition of the linked wireless communication devices STA changes (e.g. all the linked wireless communication devices STA support the beamformer mechanism, or the related information of the link quality of the beamforming target device group BF_tar or the antenna diversity target device group DIV_tar significantly changes), the flow will enter step S408 and the arbitration flow will end at step S410, meaning that the previous arbitration is aborted. When the condition 4 in step S406 is satisfied at another time, step S412 will be entered again for a new arbitration stage. If the condition of the linked wireless communication devices STA does not change, step S406 will be entered. Similarly, if the condition of the linked wireless communication devices STA changes in step S406, the previous arbitration stage will be aborted and the flow will enter step S410; else, if the condition of the linked wireless communication devices STA does not change, the flow will enter step S414 for the beamforming training stage, where the RX antenna diversity mechanism of the wireless communication device AP will be deactivated and the beamformee mechanism of the wireless communication device AP will be activated. The related information of the link quality is recorded instantly. In this embodiment, the beamforming information BF_info can be derived from at least one of the MCS index and the throughput of each of the linked wireless communication device in the target area. At this point, the flow goes back to step S402.

In the same way, if the condition of the linked wireless communication devices STA does not change, the arbitration will continue and step S416 will be entered. The antenna diversity target device group DIV_tar and the beamforming target device group BF_tar are utilized for the antenna diversity/beamforming arbitration. For example, it may be helpful to check whether the related information of the link quality of the beamforming target device group BF_tar has a significant improvement after entering the beamforming training stage of step S414 (compared with the antenna diversity training stage of step S412), as well as to check whether the related information of the link quality of the antenna diversity target device group DIV_tar significantly degrades after entering the beamforming training stage of step S414. If the related information of the link quality of the beamforming target device group BF_tar has a significant improvement and the related information of the link quality of the antenna diversity target device group DIV_tar does not significantly degrade, then it will be determined that step S418 should be entered the next time the condition 4 is satisfied. In step S418, the RX antenna diversity mechanism of the wireless communication device AP is deactivated and the beamformee mechanism of the wireless communication device AP is activated. In addition, step S418 will be entered in the following arbitration for a specific number N of cycles (e.g. N=20); else, if it is determined that little advantage is gained from the beamforming mechanism of the wireless communication device AP, or other devices of the antenna diversity target device group DIV_tar are seriously affected by the beamforming mechanism of the wireless communication device AP, then step S420 will be entered. In step S420, the RX antenna diversity mechanism of the wireless communication device AP is activated and the beamformee mechanism of the wireless communication device AP is deactivated. In addition, step S420 will be entered in the following arbitration for a specific number N of cycles (e.g. N=20). This is for illustrative purposes only, and not a limitation of the present disclosures. Alternative designs which achieve the same or similar functions and comply with the concept of the present invention also fall within the scope of the present invention. For example, it is also feasible to check whether the maximum of the MCS index or the weighted value of the MCS index of the beamforming target device group BF_tar has a significant improvement after entering the beamforming training stage of step S414 (compared with the antenna diversity training stage of step S412), as well as to check whether the maximum of the MCS index or the weighted value of the MCS index of the beamforming target device group BF_tar significantly degrades after entering the beamforming training stage of step S414.

It should be noted that, in step S420, the wireless communication device AP may transmit a default value (e.g. an identity matrix) in response to an NDPA sent from a part of the linked wireless communication devices, due to the beamforming mechanism of the wireless communication device AP being deactivated; alternatively, the wireless communication device AP may not respond. This is for illustrative purpose only, and not a limitation of the present disclosures.

Figure 5:
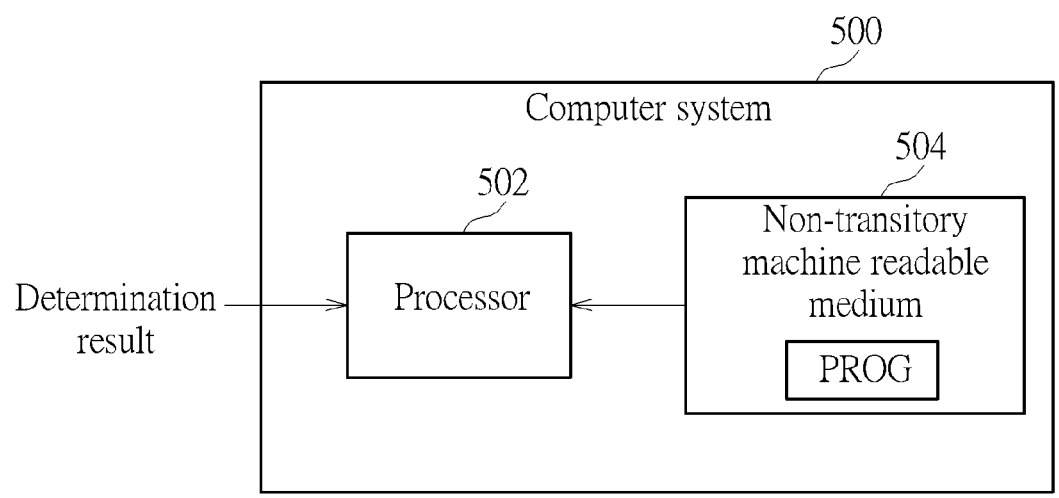
FIG. 5 is a diagram illustrating a computer system for performing the antenna diversity and beamforming coexistence method according to an exemplary embodiment of the present invention.

Please refer to FIG. 5, which is a diagram illustrating a computer system for performing the antenna diversity and beamforming coexistence method according to an exemplary embodiment of the present invention. The computer system 500 includes a processor 502 and a non-transitory machine readable medium 504. The computer system 500 could be a personal computer, and the non-transitory machine readable medium 504 could be any storage device capable of storing data in a personal computer, e.g. a volatile memory, non-volatile memory, hard disk or CD-ROM. In this embodiment, the non-transitory machine readable medium 504 stores a program code PROG, wherein when the program code PROG is loaded and executed by the processor 502, the program code PROG enables the processor to perform the disclosed antenna diversity and beamforming coexistence method (i.e. the steps 202-214 shown in FIG. 2) of the present invention. Those skilled in the art will readily understand the deadlock detection processed by making the processor 502 execute the program code PROG, therefore further description is omitted here for brevity.

The disclosed antenna diversity and beamforming coexistence method enables a wireless communication device which supports both the transmitter/receiver (TX/RX) antenna diversity mechanism and the beamformer/beamformee mechanism to choose an appropriate scheme depending on real circumstances, to thereby minimize the channel effect as well as to maximize the signal quality and stability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna diversity and beamforming coexistence method applied to a wireless communication device which supports both a transmitter/receiver (TX/RX) antenna diversity mechanism and a beamformer/beamformee mechanism, comprising:
   determining whether a plurality of wireless link partners linked to the wireless communication device respectively support the beamformer/beamformee mechanism and accordingly generating a determination result; and
   determining whether to enable/disable the TX/RX antenna diversity mechanism of the wireless communication device and to enable/disable the beamformer/beamformee mechanism of the wireless communication device according to the determination result;
   wherein when the beamformee mechanism is determined to be disabled, controlling the wireless communication device to transmit a default value in response to a received beamforming protocol packet; and the step of determining whether to enable/disable the TX/RX antenna diversity mechanism of the wireless communication device and to enable/disable the beamformer/beamformee mechanism of the wireless communication device according to the determination result comprises:

when the determination result indicates that a portion of the plurality of wireless link partners support the beamformer mechanism, determining to enable/disable the RX antenna diversity mechanism of the wireless communication device and enable/disable the beamformee mechanism of the wireless communication device by determining whether any of the plurality of wireless link partners complies with a specific condition.

2. The method of claim 1, further comprising:

before determining whether to enable/disable the TX/RX antenna diversity mechanism of the wireless communication device and to enable/disable the beamformer/beamformee mechanism of the wireless communication device according to the determination result, enabling the TX/RX antenna diversity mechanism of the wireless communication device and disabling the beamformer/beamformee mechanism of the wireless communication device.

3. The method of claim 1, wherein the step of determining whether to enable/disable the TX/RX antenna diversity mechanism of the wireless communication device and to enable/disable the beamformer/beamformee mechanism of the wireless communication device according to the determination result comprises:

when the determination result indicates that at least one of the plurality of wireless link partners supports the beamformee mechanism, disabling the TX antenna diversity mechanism of the wireless communication device and enabling the beamformer mechanism of the wireless communication device in respect to at least one of the plurality of wireless link partners which supports the beamformee mechanism.

4. The method of claim 3, further comprising:

every first specific time interval, enabling the TX antenna diversity mechanism of the wireless communication device in respect to at least one of the plurality of wireless link partners which supports the beamformee mechanism for a second specific time interval.

5. The method of claim 1, wherein the step of determining whether to enable/disable the TX/RX antenna diversity mechanism of the wireless communication device and to enable/disable the beamformer/beamformee mechanism of the wireless communication device according to the determination result comprises:

when the determination result indicates that each of the plurality of wireless link partners support the beamformer mechanism, disabling the RX antenna diversity mechanism of the wireless communication device and enabling the beamformee mechanism of the wireless communication device.

6. The method of claim 5, further comprising:

every first specific time interval, enabling the RX antenna diversity mechanism of the wireless communication device for a second specific time interval.

7. The method of claim 1, wherein the specific condition refers to a throughput within a specific interval and a link quality below a threshold.

8. The method of claim 7, wherein the link quality refers to one or a combination of a portion or all of a Received Signal Strength Indicator (RSSI), a Modulation and Coding Scheme (MSC) indicator, a Signal-to-Noise Ratio (SNR), an Error Vector Magnitude (EVM), a Channel State Information (CSI), a Bit Error Rate (BER) and a Packet Error Rate (PER).

9. The method of claim 1, wherein the step of determining to enable/disable the RX antenna diversity mechanism of the wireless communication device and enable/disable the beamformee mechanism of the wireless communication device by determining whether any of the plurality of wireless link partners complies with the specific condition comprises:

when each link partner complying with the specific condition supports the beamformer mechanism, disabling the RX antenna diversity mechanism of the wireless communication device and enabling the beamformee mechanism of the wireless communication device.

10. The method of claim 1, wherein the step of determining to enable/disable the RX antenna diversity mechanism of the wireless communication device and enable/disable the beamformee mechanism of the wireless communication device by determining whether any of the plurality of wireless link partners complies with the specific condition comprises:

when a portion of the link partners complying with the specific condition support the beamformer mechanism while the rest of the link partners complying with the specific condition do not support the beamformer mechanism, determining to enable/disable the RX antenna diversity mechanism of the wireless communication device and enable/disable the beamformee mechanism of the wireless communication device by referring to at least one of a link quality and a throughput of the link partners complying with the specific condition.

11. The method of claim 10, wherein the step of determining to enable/disable the RX antenna diversity mechanism of the wireless communication device and enable/disable the beamformee mechanism of the wireless communication device by referring to at least one of the link quality and the throughput of the link partners complying with the specific condition comprises:

enabling the RX antenna diversity mechanism of the wireless communication device and disabling the beamformee mechanism of the wireless communication device, and deriving an antenna diversity information in accordance with at least one of the link quality and the throughput of the link partners complying with the specific condition;

disabling the RX antenna diversity mechanism of the wireless communication device and enabling the beamformee mechanism of the wireless communication device, and deriving a beamforming information in accordance with at least one of the link quality and the throughput of the link partners complying with the specific condition; and determining whether to enable the RX antenna diversity mechanism of the wireless communication device and disable the beamformee mechanism of the wireless communication device, or to disable the RX antenna diversity mechanism of the wireless communication device and enable the beamformee mechanism of the wireless communication device in accordance with the antenna diversity information and the beamforming information.

12. A non-transitory machine readable medium storing a program code, wherein when executed by a processor, the program code enables the processor to perform an antenna diversity and beamforming coexistence method, wherein the method is applied for a wireless communication device which supports both a transmitter/receiver (TX/RX) antenna diversity mechanism and a beamformer/beamformee mechanism, the method comprising:

determining whether a plurality of wireless link partners linked to the wireless communication device respectively support the beamformer/beamformee mechanism and accordingly generating a determination result; and determining whether to enable/disable the TX/RX antenna diversity mechanism of the wireless communication device and to enable/disable the beamformer/beamformee mechanism of the wireless communication device according to the determination result;

wherein when the beamformee mechanism is determined to be disabled, controlling the wireless communication device to transmit a default value in response to a received beamforming protocol packet; and the step of determining whether to enable/disable the TX/RX antenna diversity mechanism of the wireless communication device and to enable/disable the beamformer/beamformee mechanism of the wireless communication device according to the determination result comprises:

when the determination result indicates that a portion of the plurality of wireless link partners support the beamformer mechanism, determining to enable/disable the RX antenna diversity mechanism of the wireless communication device and enable/disable the beamformee mechanism of the wireless communication device by determining whether any of the plurality of wireless link partners complies with a specific condition.

13. The non-transitory machine readable medium of claim 12, wherein the method further comprises:

before determining whether to enable/disable the TX/RX antenna diversity mechanism of the wireless communication device and to enable/disable the beamformer/beamformee mechanism of the wireless communication device according to the determination result, enabling the TX/RX antenna diversity mechanism of the wireless communication device and disabling the beamformer/beamformee mechanism of the wireless communication device.

14. The non-transitory machine readable medium of claim 12, wherein determining whether to enable/disable the TX/RX antenna diversity mechanism of the wireless communication device and to enable/disable the beamformer/beamformee mechanism of the wireless communication device according to the determination result comprises:

when the determination result indicates that at least one of the plurality of wireless link partners supports the beamformee mechanism, disabling the TX antenna diversity mechanism of the wireless communication device and enabling the beamformer mechanism of the wireless communication device in respect to at least one of the plurality of wireless link partners which supports the beamformee mechanism.

15. The non-transitory machine readable medium of claim 14, wherein the method further comprises:

every first specific time interval, enabling the TX antenna diversity mechanism of the wireless communication device in respect to at least one of the plurality of wireless link partners which supports the beamformee mechanism for a second specific time interval.

16. The non-transitory machine readable medium of claim 12, wherein the step of determining whether to enable/disable the TX/RX antenna diversity mechanism of the wireless communication device and to enable/disable the beamformer/beamformee mechanism of the wireless communication device according to the determination result comprises:

when the determination result indicates that each of the plurality of wireless link partners support the beamformer mechanism, disabling the RX antenna diversity mechanism of the wireless communication device and enabling the beamformee mechanism of the wireless communication device.

17. The non-transitory machine readable medium of claim 16, wherein the method further comprises:

every first specific time interval, enabling the RX antenna diversity mechanism of the wireless communication device for a second specific time interval.

18. The non-transitory machine readable medium of claim 12, wherein complying with the specific condition refers to a throughput within a specific interval and a link quality below a threshold.

\* \* \* \* \*